Nov. 3, 1953 A. V. BROGREN 2,657,756
BATTERY HOLD-DOWN FRAME AND METHOD OF FORMING SAME
Filed Aug. 24, 1950 2 Sheets-Sheet 1
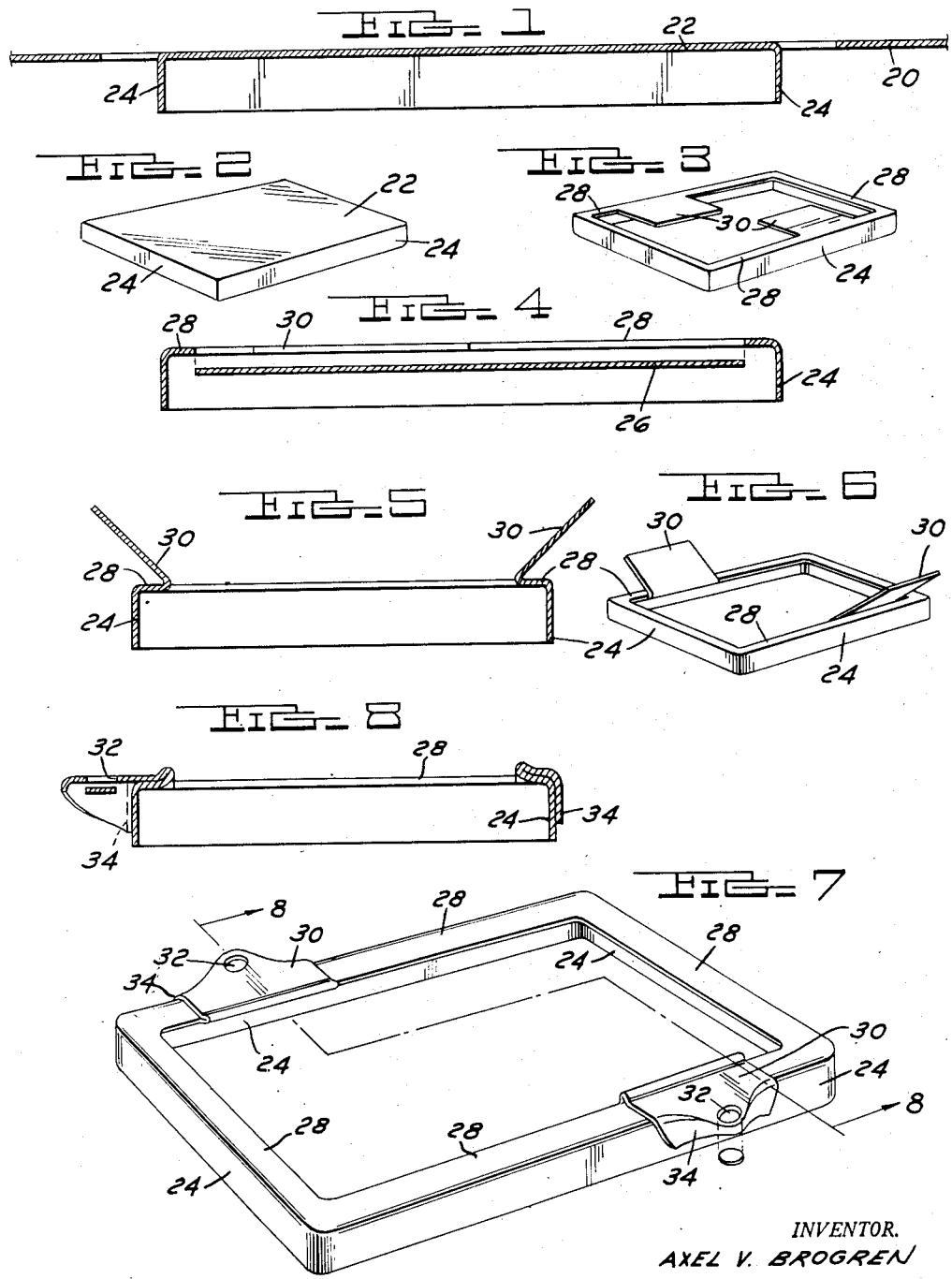
INVENTOR.
AXEL V. BROGREN
BY
Burton & Parker
ATTORNEYS Nov. 3, 1953          A. V. BROGREN          2,657,756
BATTERY HOLD-DOWN FRAME AND METHOD OF FORMING SAME
Filed Aug. 24, 1950          2 Sheets-Sheet 2
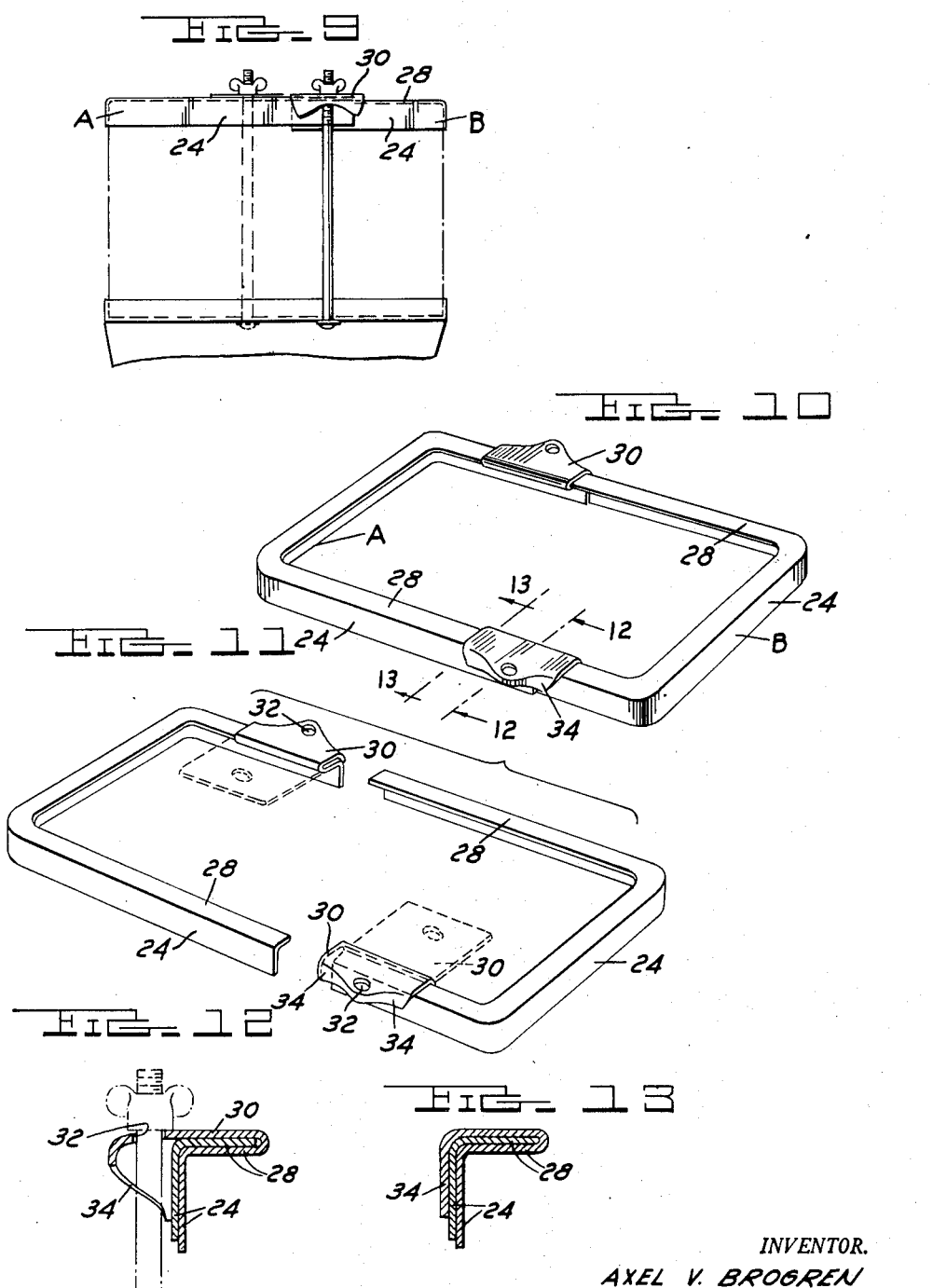
INVENTOR.
AXEL V. BROGREN
BY
Burton & Parker
ATTORNEYS Patented Nov. 3, 1953

2,657,756

UNITED STATES PATENT OFFICE 2,657,756

BATTERY HOLD-DOWN FRAME AND METHOD OF FORMING SAME

Axel V. Brogren, Detroit, Mich., assignor to Parsons Corporation, Detroit, Mich., a corporation of Michigan Application August 24, 1950, Serial No. 181,210

4 Claims. (Cl. 180—68.5)

1

This invention relates to an improved battery hold down and to an improved method of forming the same.

An object is to provide a battery hold down which is inexpensive and of strong and rugged construction and which is formed from a single sheet of metal. The hold down may be formed to the size of the battery with which it is intended to be used or it may be made as illustrated in the modification in an adjustable form so as to be fitted to batteries of somewhat different size.

A meritorious feature of the construction is that the hold down is provided with apertured outwardly projecting ears through which hold down rods or bolts are extended which ears are formed as integral extensions of a top wall portion of the hold down frame. These extensions are bent outwardly over the top wall portion of the hold down frame and project outwardly therebeyond. Each extension has one part which is apertured to receive a hold down bolt or the like. It has other portions which are bent downwardly over and against a side wall of the frame to support the apertured part in its extended position.

In the telescoping embodiment of the invention the frame is divided into separate end sections arranged to be telescoped together. These end sections are generally U-shaped. Each end section has one side which is provided with an ear formed as an integral part thereof which ear is so shaped with respect to the side that it provides therewith a space adapted to telescopingly receive the complementary side of the cooperating end section.

In the process of fabricating this hold down there is cut from a single sheet of metal a blank the margins of which are bent at a right angle to the plane of the blank and there is then cut out of the bottom of this blank a portion of such size and shape to leave marginal portions provided with opposed offset inwardly extending ears which ears are bent outwardly over the top portion and downwardly over the side wall portion at the two sides of the frame and are apertured to provide apertured hold down ears of the frame.

Various other objects, advantages and meritorious features of the invention will become more fully apparent from the following specification, appended claims and accompanying drawings, wherein:

Fig. 1 is a cross sectional view taken through a metal sheet undergoing the first stamping and severing operation;

2

Fig. 2 is a perspective of a blank cut from the sheet with the margins bent at a right angle to the plane of the sheet;

Fig. 3 is a perspective of a blank following the cutting out of a portion of the bottom thereof as illustrated in Fig. 4;

Fig. 4 illustrates the cutting out of that part of the bottom of the blank necessary to form Fig. 3;

Figs. 5 and 6 illustrate the bending up of the inward extensions, Figure 5 being a cross sectional view and Figure 6 being a perspective;

Fig. 7 is a perspective of a hold down of integral form;

Fig. 8 is a cross sectional view taken along line 8—8 of Fig. 7;

Fig. 9 is an elevation of a side of the battery engaged by a modified form of my improved battery hold down;

Fig. 10 is a perspective of the modified form of my improved battery hold down shown in Fig. 9;

Fig. 11 is a perspective of the battery hold down shown in Fig. 10 with the end sections separated from each other;

Fig. 12 is a cross sectional view taken along line 12—12 of Fig. 10; and

Fig. 13 is a cross sectional view taken along line 13—13 of Fig. 10.

In the drawing in Fig. 1 a sheet of metal is indicated as 20 and a blank indicated in Figs. 1 and 2 as 22 is shown as being formed therefrom. This blank is so formed as to provide marginal flanges 24 which project at a right angle with respect to the plane of the blank. Following the forming of the blank shown in Fig. 2 the part 26 indicated as cut away is shown in Fig. 4. After this part 26 has been cut away the blank exhibits the shape and form shown in Fig. 3 in which it will be seen it is in the form of a rectangular frame having side wall portions 24 and top wall portions 28, disposed at a right angle with respect to each other.

Each side of the rectangular frame is provided with an ear formed as an integral extension of the top wall portion 28. These ears are indicated as 30 and as shown in Fig. 3 they are disposed in a position to be offset each other lengthwise of the frame. These ears 30 are bent upwardly and outwardly out of the plane of the top wall portions 28 as shown in Figs. 5 and 6. This bending is then continued as shown in Figs. 7 and 8 so that the intermediate part of the extension projects outwardly beyond the top wall portion 28 and is apertured as at 32. It will be seen that those parts of the ear beyond the intermediate apertured part are bent downwardly over and against the side wall portion 24 of the frame as shown at 34 particularly in Figs. 7 and 8.

The shaping of the ear in the manner illustrated out of an integral extension of the top wall portion of a side of the frame provides a hold down ear which is strong and substantial and the apertured hold down part thereof is supported by end sections 34 bearing against the side wall portions of the frame.

The construction just described is that of an integral one-piece hold down formed to the required size to fit a battery. It is illustrated on sheet 1 in connection with the illustration of the process and forming the hold down. If desired the hold down might be made in two parts which could be telescoped together to fit batteries of slightly different length. This construction is shown in Figs. 9 through 13 on sheet 2 of the drawings. The formation of the frame shown in Figs. 9 through 13 might be similar as to process of its fabrication to that heretofore described except that the frame would be made longer than required and then cut apart as shown in Fig. 11. The ear extensions however instead of being bent down closely over and against the top wall portions and the side wall portions of the sides of the frame are so bent as to leave a space between the ear extensions and the top wall portions of the side wall portions of the sides of the frame. This space is sufficient to receive telescopingly therein the complementary sides of the cooperating end sections.

In the figures of sheet 2 the end sections are indicated generally as A and B. Each end section is of a generally U-shape so that when the two sections are telescoped together the frame exhibits a generally rectangular shape. Each end section has a side wall portion 24 and a top wall portion 28. One side of each end frame section is substantially shorter than the other side thereof and the short side is provided with the integral ear extension 30 described in connection with the description of the structure shown in Fig. 7. This ear extension 30 is bent outwardly over the top wall portion 28 leaving a space therebetween and is extended outwardly beyond such top wall portion and provided with an aperture 32 as heretofore described. The ends beyond the aperture are bent downwardly as at 34 providing a space between such bent down ends and the side wall 34. Within this space the complementary side wall of the cooperating end section is received as shown in Figs. 10, 12 and 13. It is apparent that this particular hold down frame may be adjusted within limits to fit batteries of slightly different length.

What I claim is:

1. That method of fabricating a battery hold down from a single sheet of metal comprising cutting and shaping the sheet to form a rectangular blank provided with marginal right angular flanges, cutting out the bottom of the blank leaving a marginal portion providing opposed offset inward extensions, bending such extensions out of the plane of the blank and over the top of said marginal portions to extend horizontally outwardly therebeyond, providing holes in said extensions beyond said marginal portions and bending opposite corner portions of said extensions downwardly against the marginal flanges of said blanks.

2. A battery hold down comprising a frame right angled in cross section forming a top wall and a side wall and contoured to the shape of the battery for seating over and around the upper edge thereof, a pair of opposing sides of said frame having ears, each of said ears being integral with said frame and extending horizontally outwardly from the top wall and having a hole in the outer portion thereof to receive hold down bolts, and each of said ears having a portion thereof adjacent the hole bent downwardly to form a brace integral with the ear and in surface contacting engagement with the side wall of the frame.

3. A battery hold down as described in claim 2 wherein said frame comprises two generally U-shaped parts adapted to telescope together, each of said ears being integral with and extending from the inner edge of said top wall, each of said ears being spaced a predetermined amount from its top wall and its side wall to telescopically receive the right angled portion of the other U-shaped part.

4. A battery hold down comprising a frame suitably shaped from a single flat sheet of material to conform to the top peripheral shape of a battery and being of a right-angular shape in cross section to form a continuous top wall and a continuous side wall which embrace the top portion of a battery, a pair of opposing sides of said frame having opposed ears offset from each other, each of said ears being integral with and extending from the inner edge of said top wall having a main body portion, a tapering end portion and side portions, said main body portion extending outwardly over and in contact with the upper surface of said top wall, said tapering end portion having substantially the same planarity as said main body portion extending outwardly beyond said side wall and having a hole therein to receive hold down bolts, and said side portions extending downwardly from said tapering end portion, said side portions engaging said side wall in surface-to-surface contact to provide bracing for said tapering end portion.

AXEL V. BROGREN.

References Cited in the file of this patent
UNITED STATES PATENTS

| Number | Name | Date |
|---|---|---|
| 1,265,924 | Lanning | May 14, 1918 |
| 1,584,119 | Moecker, Jr. et al. | May 11, 1926 |
| 1,611,519 | Franklin | Dec. 21, 1926 |
| 1,705,381 | Snyder | Mar. 12, 1929 |
| 2,415,284 | Holman et al. | Feb. 4, 1947 |
| 2,476,948 | Sanford | July 19, 1949 |
| 2,488,360 | Williams | Nov. 15, 1949 |
| 2,491,997 | Meyer | Dec. 20, 1949 |
| 2,613,755 | Newby et al. | Oct. 14, 1952 |